US009789962B2

(12) United States Patent
Ehlers et al.

(10) Patent No.: US 9,789,962 B2
(45) Date of Patent: Oct. 17, 2017

(54) PASSENGER SERVICE MODULE WITH INTEGRATED CABIN LIGHTING

(71) Applicant: Airbus Operations GmbH, Hamburg (DE)

(72) Inventors: Bernd Ehlers, Hamburg (DE); Mark Herzog, Barsbuettel (DE)

(73) Assignee: Airbus Operations GmbH, Hamburg (DE)

( * ) Notice: Subject to any disclaimer, the term of this patent is extended or adjusted under 35 U.S.C. 154(b) by 161 days.

(21) Appl. No.: 14/175,660

(22) Filed: Feb. 7, 2014

(65) Prior Publication Data

US 2014/0169012 A1 Jun. 19, 2014

Related U.S. Application Data

(63) Continuation of application No. PCT/EP2012/003415, filed on Aug. 9, 2012.
(Continued)

(30) Foreign Application Priority Data

Aug. 11, 2012 (DE) .......................... 10 2011 110 010

(51) Int. Cl.
*B64D 11/00* (2006.01)
*B60Q 3/47* (2017.01)

(52) U.S. Cl.
CPC ............... *B64D 11/00* (2013.01); *B60Q 3/47* (2017.02); *B64D 2011/0038* (2013.01);
(Continued)

(58) Field of Classification Search
CPC ............... B64D 11/00; B64D 11/0015; B64D 2011/0038; B64D 2011/0053; B64D 47/02; B64D 47/04
(Continued)

(56) References Cited

U.S. PATENT DOCUMENTS 3,330,506 A * 7/1967 Robillard ............... B64D 11/00 244/118.5
D259,038 S * 4/1981 Smith .......................... D12/195
(Continued)

FOREIGN PATENT DOCUMENTS

DE 19502658 3/1996
DE 102008058271 5/2010
(Continued)

OTHER PUBLICATIONS

English Translation of "WO 2010/108757 A2" provided by <http://worldwide.espacenet.com/> Accessed Feb. 10, 2016.*
International Search Report, Dec. 10, 2012.

*Primary Examiner* — Katherine Mitchell
*Assistant Examiner* — Johnnie A Shablack
(74) *Attorney, Agent, or Firm* — Greer, Burns & Crain, Ltd.

(57) ABSTRACT

A service module for supplying passengers in a passenger space of a means of transport, in particular of an aircraft, and to a service system having a service channel and a plurality of such service modules. The service module comprises at least one service component arrangement having one or more service components for individually supplying one or more passengers, and a cabin lighting unit for illuminating the passenger space of the means of transport, in particular of the aircraft.

6 Claims, 3 Drawing Sheets

Related U.S. Application Data

(60) Provisional application No. 61/522,273, filed on Aug. 11, 2011.

(52) U.S. Cl.
CPC ............ *B64D 2011/0046* (2013.01); *B64D 2011/0053* (2013.01); *Y02T 50/46* (2013.01)

(58) Field of Classification Search
USPC .......................... 244/118.5, 118.1; 362/470
See application file for complete search history.

(56) References Cited

U.S. PATENT DOCUMENTS

| | | | | |
|---|---|---|---|---|
| 5,422,794 A * | 6/1995 | Drake | B60Q 3/0233 | 244/118.1 |
| 5,556,332 A * | 9/1996 | Schumacher | B64D 11/00 | 454/64 |
| 5,651,733 A * | 7/1997 | Schumacher | B64D 11/00 | 362/471 |
| 6,848,653 B2 * | 2/2005 | Finke | B64D 11/0015 | 244/118.5 |
| 7,027,767 B2 * | 4/2006 | de La Chapelle | B64D 11/0015 | 455/3.01 |
| 8,317,132 B2 * | 11/2012 | Pein | B64D 11/003 | 244/118.5 |
| 8,430,358 B2 * | 4/2013 | Schneider | B64D 11/003 | 244/118.1 |
| 8,517,308 B2 * | 8/2013 | Schneider | B64D 11/003 | 244/118.1 |
| 8,556,478 B2 * | 10/2013 | Riedel | B60Q 3/025 | 362/231 |
| 8,643,211 B2 * | 2/2014 | Meckes | B60Q 3/0206 | 307/11 |
| 8,844,865 B2 * | 9/2014 | Gehm | B64D 11/00 | 244/118.1 |
| 8,851,420 B2 * | 10/2014 | Schliwa | B64D 11/003 | 244/117 R |
| 8,998,687 B2 * | 4/2015 | Schneider | B64D 11/00 | 244/118.5 |
| 9,010,686 B2 * | 4/2015 | Saint-Jalmes | B64D 11/00 | 244/118.1 |
| 9,016,626 B2 * | 4/2015 | Schliwa | B61D 35/00 | 244/118.5 |
| 2006/0032979 A1 * | 2/2006 | Mitchell | B64D 11/00 | 244/118.6 |
| 2006/0113810 A1 * | 6/2006 | Kuhl | B60R 7/04 | 296/24.34 |
| 2006/0237585 A1 * | 10/2006 | Lau | B60Q 3/025 | 244/118.5 |
| 2007/0061847 A1 * | 3/2007 | Callahan | B64D 11/0015 | 725/76 |
| 2008/0186721 A1 * | 8/2008 | Vogel | B60Q 3/025 | 362/471 |
| 2008/0219013 A1 * | 9/2008 | Budinger | A61N 5/0618 | 362/471 |
| 2009/0079705 A1 * | 3/2009 | Sizelove | B64D 11/0015 | 345/173 |
| 2010/0012780 A1 * | 1/2010 | Kohlmeier-Beckmann | B60Q 3/0253 | 244/118.5 |
| 2010/0096919 A1 * | 4/2010 | Meckes | B60Q 3/0206 | 307/9.1 |
| 2011/0147520 A1 * | 6/2011 | Schneider | B64D 11/00 | 244/118.5 |
| 2011/0240796 A1 * | 10/2011 | Schneider | B64D 11/00 | 244/118.5 |
| 2012/0012707 A1 * | 1/2012 | Schliwa | B64D 11/003 | 244/118.5 |
| 2012/0230530 A1 * | 9/2012 | Schevardo | B60Q 3/0253 | 381/333 |
| 2012/0234974 A1 * | 9/2012 | Sieben | B64D 11/003 | 244/118.5 |
| 2012/0292986 A1 * | 11/2012 | Riedel | B60Q 3/0259 | 307/9.1 |
| 2012/0312921 A1 * | 12/2012 | Grosse-Plankermann | B64D 11/003 | 244/118.5 |
| 2013/0039020 A1 * | 2/2013 | Rittner | B64D 11/0015 | 361/740 |
| 2013/0118493 A1 * | 5/2013 | Umlauft | A62B 7/00 | 128/204.18 |
| 2013/0206903 A1 * | 8/2013 | Savian | B64D 11/0015 | 244/118.1 |
| 2013/0286673 A1 * | 10/2013 | Umlauft | B64D 11/00 | 362/470 |
| 2014/0169012 A1 * | 6/2014 | Ehlers | B64D 11/00 | 362/470 |
| 2014/0215534 A1 * | 7/2014 | Meckes | B64D 11/00 | 725/75 |
| 2014/0299711 A1 * | 10/2014 | Ivester | B64C 1/066 | 244/118.1 |
| 2014/0313751 A1 * | 10/2014 | Abel | B64D 47/02 | 362/464 |
| 2014/0329452 A1 * | 11/2014 | Wirth | B64D 13/06 | 454/152 |
| 2015/0016129 A1 * | 1/2015 | Castanha | B64D 11/00 | 362/471 |
| 2015/0069182 A1 * | 3/2015 | Jacobsen | B64D 11/003 | 244/118.5 |
| 2015/0090839 A1 * | 4/2015 | Freund | B64D 11/0015 | 244/118.5 |
| 2015/0097082 A1 * | 4/2015 | Paulino | B64D 13/00 | 244/118.5 |
| 2015/0151679 A1 * | 6/2015 | Aruga | B64D 47/02 | 362/470 |
| 2015/0166178 A1 * | 6/2015 | Savian | B64D 11/00 | 244/118.6 |
| 2015/0232182 A1 * | 8/2015 | Schneider | B64D 11/00 | 244/118.6 |
| 2015/0251759 A1 * | 9/2015 | Ibrahim | B64D 11/0015 | 244/118.5 |

FOREIGN PATENT DOCUMENTS

| | | | | |
|---|---|---|---|---|
| DE | 10 2011 013 368.2 | * | 3/2011 | ............. H05K 7/00 |
| EP | 0723911 | | 12/1995 | |
| WO | 2010057744 | | 5/2010 | |
| WO | 2010108757 | | 9/2010 | |

* cited by examiner

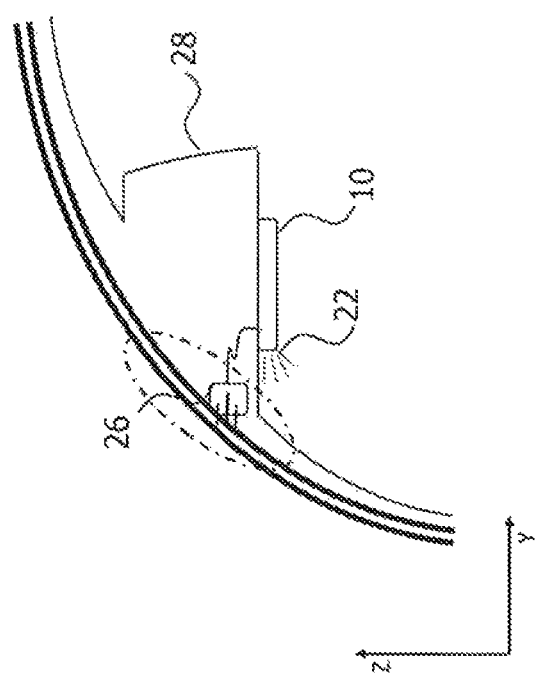

PASSENGER SERVICE MODULE WITH INTEGRATED CABIN LIGHTING

CROSS-REFERENCES TO RELATED APPLICATIONS

This application is a continuation of International Application PCT/EP2012/003415 filed Aug. 9, 2012, designating the United States and published on Feb. 14, 2013 as WO 2013/020708. This application also claims the benefit of the U.S. Provisional Application No. 61/522,273, filed on Aug. 11, 2011, and of the German patent application No. 10 2011 110 010.9 filed on Aug. 11, 2011. The entire disclosures of the above are incorporated herein by way of reference.

BACKGROUND OF THE INVENTION

The present invention relates to a service module for supplying passengers in a passenger space of a means of transport, in particular of an aircraft, and to a service system having a service channel and a plurality of such service modules which is connected to the service channel in order to supply the passengers.

Service systems as such are used in a means of transport, such as, for example, an aircraft, a bus or a train, to supply the passengers in the passenger spaces (also called cabins) individually with, for example, air, light, music, oxygen, information or the like, according to which comfort and control elements (called service components for short hereinbelow) are provided in service modules of the service system. In addition to the service modules provided with service components (also referred to as service panels), so-called functionless intermediate panels (also called infill panels) are often provided between the service modules.

The service channel, which is also referred to as the service line, conventionally contains the necessary functional means for all the service components in separate lines, such as, for example, an air line for the fresh air supply to the air nozzles and electric power and/or signal transmission lines for electrical service components, such as reading lights, loudspeakers or visual display elements (e.g., fasten seatbelt indicator elements).

It is known to accommodate individual service components, such as reading lamps, in a first functional panel and to arrange service components of different kinds, such as loudspeakers, on a second functional panel that is separate from the first functional panel and to provide functionless infill panels between the separate functional panels. The service components arranged on separate functional panels are then each connected to associated interfaces of the service channel by way of suitable feed lines. For example, a feed line of a reading light is connected by way of a suitable plug to a terminal element of the service channel acting as an interface. The feed line of a loudspeaker, which is separate from the feed line of a reading light, is connected by way of a further suitable plug to a further terminal element of the service channel acting as an interface.

EP 0 723 911 A1 and U.S. Pat. No. 5,651,733 disclose an arrangement for supplying passengers in a passenger cabin, in particular in an aircraft. The arrangement has a service unit with comfort and control elements, such as reading light, attendant call button, loudspeaker, air nozzle and oxygen mask and oxygen generator and visual display elements. The arrangement further has feed lines between a service line and the service unit, the service unit being arranged beneath a luggage shelf.

From DE 10 2008 058 271 A1 and WO 2010/057744 A2 there is further known a service unit for mounting on a service channel of a means of transport, which service unit has at least one service element for a passenger, a fastening device for fastening the service unit to the service channel, and a connecting device for automatically connecting the service element to the service channel. The service unit and the service channel interact so that fastening and automatic connection take place in one operation.

SUMMARY OF THE INVENTION

It is an object of the present invention to provide a service module and a service system having a service channel and a plurality of service modules, by means of which a reduction in the connecting elements necessary for connecting the service modules to the service channel is achieved.

The service module according to the invention for supplying passengers in a passenger space of a means of transport, in particular of an aircraft, has at least one service component arrangement and a cabin lighting unit. The at least one service component arrangement comprises one or more service components for individually supplying one or more passengers. The cabin lighting unit is configured to illuminate the passenger space of the means of transport, in particular of the aircraft.

The expression service component can be understood as meaning any comfort and control elements conceivable for a means of transport, in particular an aircraft. Examples of service components which may be mentioned here, without implying any limitation, are air nozzles, reading lamps, (attendant) call buttons, fasten seatbelt indicator elements, covers for oxygen masks, and loudspeakers. Accordingly, a service component arrangement can be understood as being an arrangement which consists of one or more service components of the same kind that are arranged on the service module. If a service component arrangement comprises a number of service components of the same kind, it is conceivable that the number of service components can be controlled independently of one another, such as, for example, operated by passengers independently of one another. For example, a number of reading lamps combined in a service component arrangement may be operated independently of one another. Likewise, however, it is conceivable that service components, such as fasten seatbelt indicator elements, of another service component arrangement are controlled centrally and indicated to the associated passengers.

Accordingly, each service component arrangement may have one or more service components of the same kind. The at least one service component arrangement may comprise an air supply unit having one or more air nozzles, a lighting unit having one or more reading lamps, an interaction unit having one or more call buttons, an information unit having one or more fasten seatbelt indicator elements, a covering unit having one or more covers for oxygen masks, and/or a loudspeaker unit having one or more loudspeakers.

The service module has one or more such service component arrangements, each of which in turn has one or more service components. For example, the service module may comprise only one service component arrangement having one or more service components of the same kind. Alternatively, the service module may have a plurality of service component arrangements, such as two, three, four, five, six, seven, eight or more than eight service component arrangements, each of which comprises one or more service components of the same kind.

A distinction is to be made between the service components, which are configured to supply one or more passengers individually, for example to supply a number of passengers seated in a row (i.e., in the transverse direction to the longitudinal axis of the means of transport), and the cabin lighting unit. The cabin lighting unit does not serve to supply one or more passengers individually. Furthermore, the cabin lighting cannot be operated, set or adjusted by the passengers individually. In addition, the cabin lighting unit does not provide the passengers with information individually. By contrast, the cabin lighting unit is controlled centrally by suitable means in the means of transport and serves to illuminate the passenger space (the cabin) of the means of transport, in particular of the aircraft. The cabin lighting unit serves in particular to supply all the passengers with light.

Irrespective of which service components are arranged on the service module, the at least one service component arrangement arranged on the service module may be in the form of or comprise an electrical service component arrangement having one or more electrical service components. For example, the electrical service component arrangement may be in the form of a lighting unit having one or more reading lamps as electrical service components, in the form of an interaction unit having one or more call buttons as electrical service components, in the form of an information unit having one or more fasten seatbelt indicator elements as electrical service components, or in the form of a loudspeaker unit having one or more loudspeakers as electrical service components. Irrespective of the exact nature of the service component arrangement and the associated service components, two or more different service component arrangements and corresponding service components are preferably arranged on the same service module.

Likewise irrespective of the type of the one or more electrical service components of the at least one service component arrangement, for example all of the one or more electrical service components and the cabin lighting unit are connectable to a common service channel, for example to a common data and/or power line of the service channel. For example, the one or more electrical service components and the cabin lighting unit may be connectable by way of a common (central) service plug to the same interface, such as a common socket, of the common service channel.

It is conceivable for a feed line (e.g., power line) to lead away from each of the electrical service components and from the cabin lighting unit, which feed lines are then combined to form a single, common feed line (e.g., a common power line), and for the common feed line (e.g., the common power line) to lead into the common service plug. Alternatively, a feed line may lead away from each of the electrical service components and from the cabin lighting unit, which feed lines are then combined to form a common bundle of feed lines, the common bundle then leading into the common service plug. Combinations of these two alternatives are naturally conceivable. For example, according to an embodiment, the feed lines of service components of a service component arrangement may first be combined to form common feed lines, which are then guided, either separately from one another or combined again to form a single common feed line, into the common service plug.

Irrespective of the precise form of the feed lines, a single common service plug may be provided for all the electrical service components of a service module. The common service plug may then be connected to a suitable interface of the service channel provided for the corresponding service module (e.g., to a data and/or power line of the service channel). By means of this configuration, connecting elements, such as plugs and feed lines, necessary for connection to the service channel are reduced. This can lead not only to a reduction in the required installation space, but also to a reduction in the weight of a service module.

According to a possible structural form, the service module may be rectangular. The service module is not limited to that form, however.

According to a further development, the cabin lighting unit may be configured in strip form along the longitudinal axis of the service module. For example, the cabin lighting unit may be integrated into the service module on one side, preferably a long side in the case of a rectangular service module. The feed line leading away from the cabin lighting unit may also be bundled together or combined with the feed lines of the one or more electrical service components to form a single feed line. Accordingly, in the case where the service module has a plurality of electrical service component arrangements each having one or more electrical service components, the one or more electrical service components of the plurality of service component arrangements as well as the cabin lighting unit may be connected to the common service channel, in particular to the common data and/or power line of the service channel, for example by way of the common service plug.

Irrespective of the type and number of electrical service component arrangements, the service module may comprise at least one non-electrical service component arrangement having one or more non-electrical service components. As the one or more non-electrical service components, the non-electrical service component arrangement may comprise or be in the form of an air supply unit having, for example, one or more air nozzles. Additionally or alternatively, the non-electrical service component arrangement may comprise or be in the form of a covering unit, such as a cover for one or more oxygen masks.

The service system according to the invention for supplying passengers in a passenger space of a means of transport, in particular of an aircraft, has a service channel as well as a first plurality of service modules, which can be configured as described above. In order to supply the passengers, the first plurality of service modules is connected to the service channel.

The service modules may be arranged adjacent to one another along the service channel, that is to say in the longitudinal direction of the means of transport, such as the aircraft, without the provision of functionless infill panels between the service modules. It is further conceivable for the service modules arranged along the service channel to be stationary relative to one another, that is to say to be arranged so that they are not displaceable relative to one another but can simply be offset. In that case, the service modules would not be able, for example, to execute a displacement movement relative to one another.

In order to ensure the supply to the passengers even with changed seat spacings, the first plurality of service modules can be replaced by a second plurality of service modules, which can likewise be configured as described above. The service modules of the second plurality are of a different size, in particular a different length, than the service modules of the first plurality.

Accordingly, in the case of increased seat spacing, a second plurality of service modules can be used in place of the first plurality of service modules, the service modules of the second plurality being longer than the service modules of the first plurality. In a corresponding manner, in the case where the seat spacing is reduced, a second plurality of service modules which have a smaller length than the service modules of the first plurality can be used. It is accordingly possible to have available several different sets of service modules, which are then arranged along the service channel according to the seat spacing in question. The service modules used are in particular matched to the seat spacing provided. For example, the length of the service modules in question can correspond to the particular spacing of the seats in the longitudinal direction of the means of transport, in particular of the aircraft.

The service modules of the first plurality of service modules may be connected together by cables in a fitted state. For example, adjacent service modules arranged along the service channel may be connected together by cables. If the service modules of the second plurality are fitted along the service channel in place of the service modules of the first plurality, they may be connected together by cables in the same manner.

BRIEF DESCRIPTION OF THE DRAWINGS

Preferred embodiments of the present invention are explained below by means of the accompanying schematic figures, in which:

FIG. 1b shows a schematic representation of the service module of FIG. 1a in a fitted state connected to the service channel.

DETAILED DESCRIPTION OF THE PREFERRED EMBODIMENTS

Figure 1A:
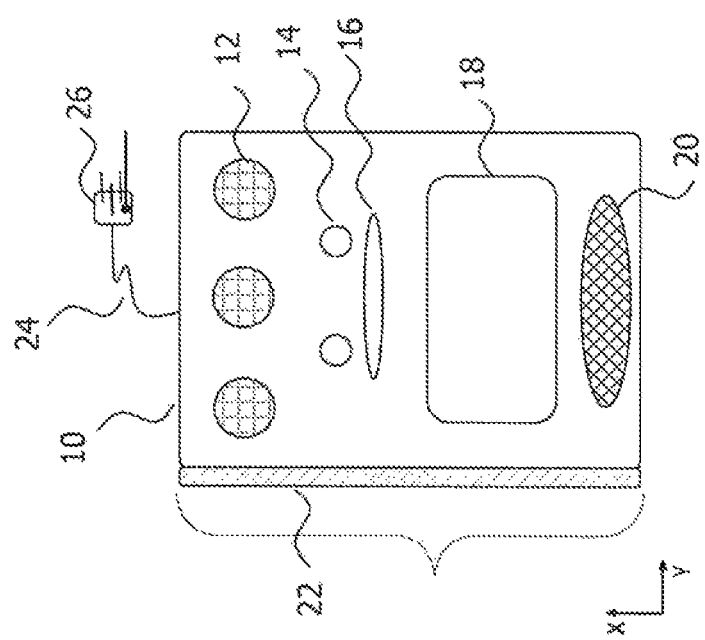
FIG. 1a shows a schematic representation of a top view of a service module according to an embodiment of the present invention.

FIG. 1a shows schematically a top view of a service module 10 for an aircraft according to an embodiment of the present invention. The service module has, for example, three reading lamps 12, two call buttons 14, a fasten seatbelt indicator element 16, a cover 18 for oxygen masks, and a loudspeaker 20. The number of service components is, however, not limited to those listed by way of example.

Service components of the same kind are combined into service component arrangements hereinbelow for easier reference. Accordingly, the service module 10 has a plurality of more precisely five, different service component arrangements, namely a lighting unit, an interaction unit, an information unit, a covering unit and a loudspeaker unit. The lighting unit comprises, for example, the three reading lamps 12, but can also comprise fewer or more than three reading lamps 12. The interaction unit comprises, for example, two call buttons 14, but can also have only one or more than two call buttons 14. As is further shown by way of example in FIG. 1a, the information unit comprises a fasten seatbelt indicator element 16, the covering unit comprises a cover 18 for oxygen masks, and the loudspeaker unit comprises a loudspeaker 20. However, the last-mentioned service component arrangements can each also have more than only one service component.

The coordinate system shown in FIG. 1a illustrates how the service module is to be fitted into an aircraft. The x-axis denotes the direction of flight, that is to say the longitudinal axis of the aircraft, and the y-axis denotes the direction transverse (perpendicular) to the direction of flight, that is to say transverse (perpendicular) to the longitudinal axis of the aircraft.

Cabin lighting 22 is additionally integrated into the service module 10. As is shown in FIG. 1a, the cabin lighting 22 is integrated into the service module on one side of the service module 10 in the longitudinal direction of the aircraft. The laterally integrated cabin lighting serves to illuminate the passenger space of the aircraft. Unlike the individual service components, the integrated cabin lighting cannot be adjusted by a passenger seated beneath it, nor is it allocated to or controllable by a passenger seated beneath it. The cabin lighting 22 is controlled centrally by the flight personnel responsible therefor.

The reading lamps 12, on the other hand, can be adjusted and switched on/off by a passenger seated beneath them. Likewise, the call buttons 14 can be operated by a passenger seated beneath them. The fasten seatbelt indicators provided on the fasten seatbelt indicator element 16 also serve to inform a passenger seated beneath them that it is necessary to fasten his seatbelt. The cover 18 for the oxygen masks serves to cover oxygen masks allocated to the passengers seated beneath it. Finally, the loudspeaker 20 serves to supply acoustic information to the passengers seated beneath it.

All the electrical service components arranged on the service module 10, that is to say the reading lamps 12, the call buttons 14, the fasten seatbelt indicator element 16 and the loudspeaker(s) 20, are provided with power lines. Likewise, the cabin lighting integrated into the service module is provided with a power line. As is shown schematically in FIG. 1a, all the power lines of a service module 10 are converted into a common power line 24, which is then guided into a common central service plug 26. Alternatively, it is conceivable, but not shown in FIG. 1a, for the corresponding power lines to lead into the central service plug 26 separately from one another.

FIG. 1b shows schematically the service module 10 in the fitted state. A coordinate system is further given in FIG. 1b, in which the y-axis indicates the direction transverse (perpendicular) to the direction of flight, that is to say transverse (perpendicular) to the longitudinal axis of the aircraft, and the z-axis indicates the direction vertical to the direction of flight, that is to say vertical to the longitudinal axis of the aircraft. As can be seen in FIG. 1b, the service module 10 with the integrated cabin lighting 22 is arranged on the underside of a luggage compartment 28 of an aircraft. The common power line 24 (shown only in FIG. 1a) of the service module 10 then leads into the common central service plug 26, which is finally connected to the service channel, more precisely to the power line of the service channel. By using a single central service plug 26, the number of plugs to be connected to the service channel is reduced. By combining the power lines into a common power line, which then leads into the central service plug 26, the number of lines is additionally reduced. Finally, by reducing the number of plugs and lines, that is to say connecting elements, the required installation space and the weight can be reduced.

Figure 2:
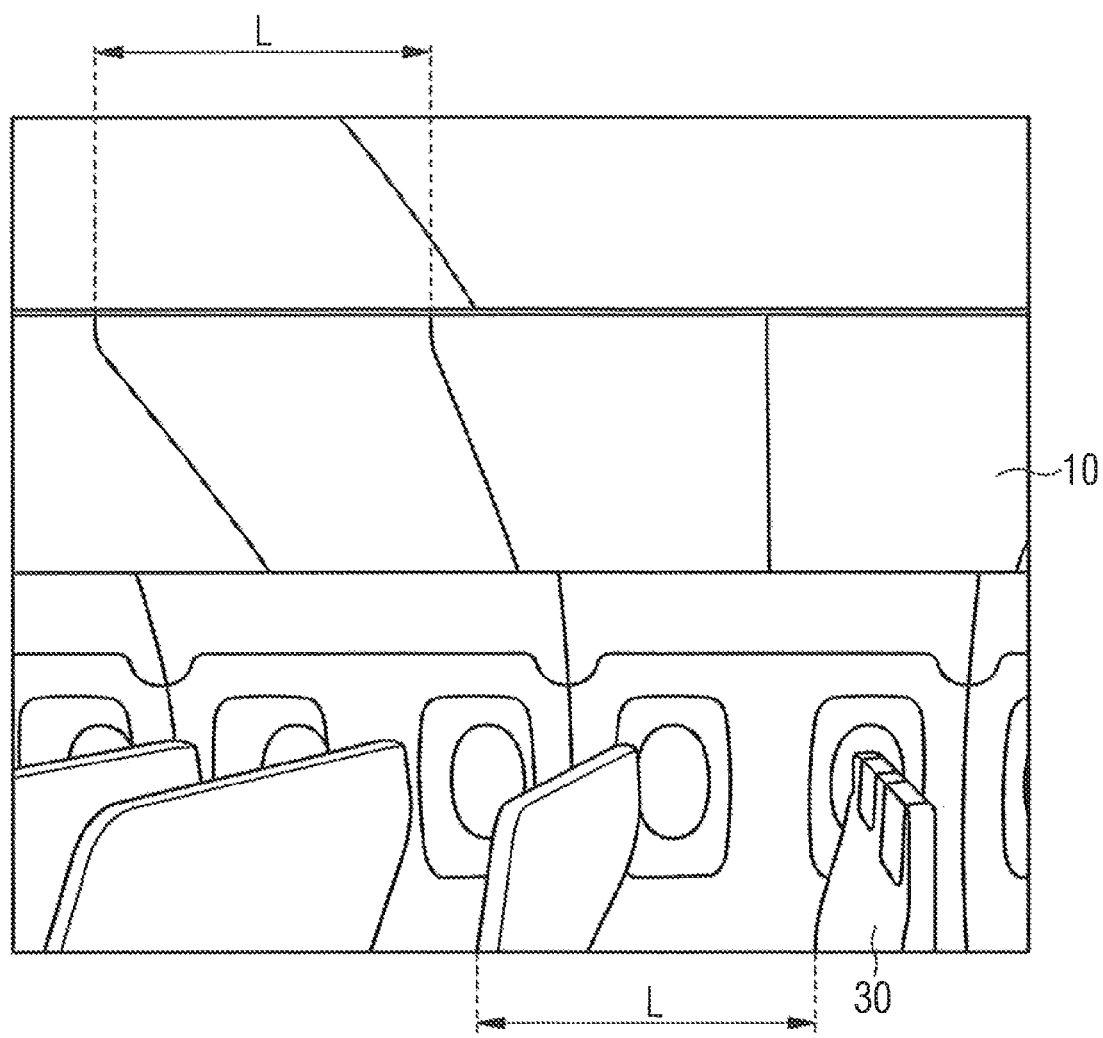
FIG. 2 shows a schematic representation of a service system having a plurality of service modules from FIG. 1a arranged along a service channel.

A number of the service modules 10 from FIG. 1a are then, as shown in FIG. 1b, arranged one behind the other and adjacent to one another on the underside of the luggage compartments along the longitudinal direction of the aircraft (in the direction of flight), as is shown by way of example in FIG. 2. The service modules 10 can be connected together by cables in a suitable manner. As can be seen in FIG. 2, each of the service modules has the same length L, which is matched to the seat spacing L. More precisely, in FIG. 2 the length L of each service module along the service channel (i.e., in the direction of flight) is as large as the spacing L between the seats 30 in the longitudinal direction of the aircraft. If the seat spacing is changed, the service modules 10 are replaced by service modules 10 of a different length, which are then in turn matched to the changed seat spacing, that is to say, for example, each have a length which corresponds to the changed seat spacing. As a result, the number of parts used can be reduced because infill panels are not necessary for changing the position of the service modules according to the seat spacing. The service modules are accordingly also simpler to install.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A service system for supplying passengers in a passenger space of a means of transport, comprising:
   a service channel; and
   a first plurality of service modules comprising:
   at least one service component arrangement having one or more service components for individually supplying one or more passengers; and
   a cabin lighting unit for illuminating the passenger space of the means of transport;
   the first plurality of service modules being connected to the service channel in order to supply the passengers, wherein the at least one service component arrangement comprises an electrical service component arrangement having one or more electrical service components,
   wherein the one of more electrical service components and the cabin lighting unit are connectable by feed lines that are combined to form a single feed line leading away from a respective service module of the first plurality of service modules to the service channel by way of a common electrical service plug; and
   a second plurality of service modules comprising:
   at least one second service component arrangement having one or more second service components for individually supplying one or more passengers; and
   a second cabin lighting unit for illuminating the passenger space of the means of transport; and
   the first plurality of service modules being replaceable by the second plurality of service modules so that the second plurality of service modules is configured to be connected to the service channel in order to supply the passengers, wherein each service module of the second plurality of service modules has a size that is different from a size of each service module of the first plurality of service modules.

2. The service system according to claim 1, wherein the first plurality of service modules are arranged adjacent to one another along the service channel.

3. The service system according to claim 1, wherein a seat spacing of seats in the passenger space is changeable between a first spacing and a second, different spacing, and the size of the service modules of the first plurality and the size of the service modules of the second plurality is matched to the first and second seat spacing, respectively, of the seats in the passenger space in a longitudinal direction of the means of transport.

4. The service system according to claim 3, wherein a length of the service modules of the first plurality corresponds the first seat spacing of the seats in the longitudinal direction of the means of transport and a length of the service modules of the second plurality corresponds to the second seat spacing of the seats in the longitudinal direction of the means of transport.

5. The service system according to claim 1, wherein the service modules of the first plurality of service modules are connected together by cables in a fitted state.

6. A service system for supplying passengers in a passenger space of a means of transport, comprising:
   a service channel; and
   a first plurality of service modules comprising:
   at least one service component arrangement having one or more service components for individually supplying one or more passengers; and
   a cabin lighting unit for illuminating the passenger space of the means of transport;
   the first plurality of service modules being connected to the service channel in order to supply the passengers, wherein the at least one service component arrangement comprises an electrical service component arrangement having one or more electrical service components,
   wherein the one of more electrical service components and the cabin lighting unit are connectable by way of a common service plug to a single interface of the service channel,
   wherein the service system further comprises a second plurality of service modules comprising:
   at least one second service component arrangement having one or more service components for individually supplying one or more passengers; and
   a second cabin lighting unit for illuminating the passenger space of the means of transport; and
   the first plurality of service modules being replaceable by the second plurality of service modules so that the second plurality of service modules is configured to be connected to the service channel in order to supply the passengers,
   wherein each service module of the second plurality of service modules has a size that is different from a size of each service module of the first plurality of service modules,
   wherein the first plurality of service modules are arranged adjacent to one another along the service channel, and
   wherein the second plurality of service modules are configured to be arranged adjacent to one another along the service channel, when the second plurality of service modules replaces the first plurality of service modules.

* * * * *